United States Patent [19]

Sollman, deceased et al.

[11] Patent Number: 5,137,046
[45] Date of Patent: Aug. 11, 1992

[54] FLUID METERING APPARATUS

[75] Inventors: Francis Sollman, deceased, late of Jacksonville, Fla., by Ruth A. Sollman, legal representative; Robert L. Roberts, West Chester, Ohio

[73] Assignee: Allied-Signal Inc., Morristown, N.J.

[21] Appl. No.: 690,448

[22] Filed: Apr. 24, 1991

[51] Int. Cl.⁵ .......................................... G05D 17/06
[52] U.S. Cl. .................................. 137/117; 60/39.281
[58] Field of Search .............................. 137/117, 501; 60/39.281

[56] References Cited

U.S. PATENT DOCUMENTS

| | | | |
|---|---|---|---|
| 3,106,934 | 10/1963 | Rogers | 137/117 |
| 3,152,603 | 10/1964 | Zeisloft | 137/117 |
| 3,853,142 | 12/1974 | Grundman | 137/501 X |
| 4,117,857 | 10/1978 | Vandemark | 137/117 |
| 4,454,713 | 6/1984 | Meyer | 60/39.281 |
| 4,578,945 | 4/1986 | Peck | 60/39.281 |

Primary Examiner—Robert G. Nilson
Attorney, Agent, or Firm—Leo H. McCormick, Jr.; Larry J. Palguta; Robert A. Walsh

[57] ABSTRACT

A fuel control apparatus for supplying metered fluid at a variable pressure to a turbine engine in response to an electrical signal. A solenoid responds to the electrical signal to vary the flow rate of the fluid to an outlet and to regulate the pressure differential across an orifice as a function of the flow rate.

12 Claims, 2 Drawing Sheets

FLUID METERING APPARATUS

This invention relates to a fluid metering apparatus and is more particularly directed to a fuel metering apparatus for a free turbine engine which nonlinearly increases flow rate as a function metering valve travel.

In gas turbine engines, specifically of the free turbine type, the regulation of speed and hence output power is regulated by the control of fuel flow to the engine. This fuel control is generally maintained by a fuel control computer measuring a number of engine operating parameters from which it calculates and schedules a fuel flow. The control computer generates an electrical control signal as a function of the scheduled fuel flow to regulate a flow mechanism or metering apparatus which accomplishes the factual fuel metering.

It is known that the fuel requirements of many free turbine engines is a function of speed which approximates a constant if measured in units proportional to fuel/air ratio, Wf/Pb, where Wf is fuel flow and Pb is burner pressure.

Therefore, to schedule fuel for a free turbine engine, the control computer, electronic control unit and flow body should increase fuel flow in synchronization with burner pressure to increases engine speed. If the relationship between fuel flow and burner pressure are substantially matched, the resulting ratio corresponds to a desired constant schedule. The ideal relationship of compressor pressure Pc with respect to speed approximates a square law to the first order. Thus, a fuel control computer and flow body that instantly schedules fuel flow as a square function of speed would offer an advantage over the current systems.

There are fuel metering systems for gas turbine engines that schedule fuel flow nonlinearly from an input signal. These systems generally comprise a controlled metering valve which regulates the opening or effective flow area of an orifice. The valve is contoured with a desired schedule such that positioning the valve nonlinearly varies the flow of fuel. Generally these systems are equipped with a pressure regulator which maintains a constant pressure difference across the valve such that fuel flow is a function of only the valve position or the open area of the orifice.

SUMMARY OF THE INVENTION

In the present invention, a fluid metering apparatus including means for supplying fluid at a variable pressure and means for metering the flow of fluid in response to an electrical signal supplies fuel to an outlet connected to a turbine. Additionally the metering means has a controlled orifice to vary the flow rate of the fluid to the outlet and means for regulating the pressure differential across the controlled orifice as a function of the flow rate.

Preferably, the regulation means varies the pressure differential in proportion to the square of the flow rate. If the differential pressure is varied in this manner and the controlled orifice area is varied linearly with the electrical signal then the flow rate as a function of the electrical signal will approximate a square law function. Moreover, if the electrical signal is representative of speed, then the flow rate versus speed function will approximate a square law.

According to the invention, it will be advantageous to generate the fuel flow rate in this manner because it will correspond closely to the ideal burner pressure function.

Another advantage of the invention is that when the flow rate varies as a square function of the electrical signal, system accuracy is increased. The square flow rate function corresponds more closely to the natural log function than does a linear flow rate. The accuracy as a percentage of point therefore increases by the extent of the improvement.

These and other objects, features, and aspects of the invention will be more clearly understood and better described if a reading of the detailed description is undertaken in conjunction with the appended drawings wherein.

DETAILED DESCRIPTION OF THE INVENTION

Figure 1:
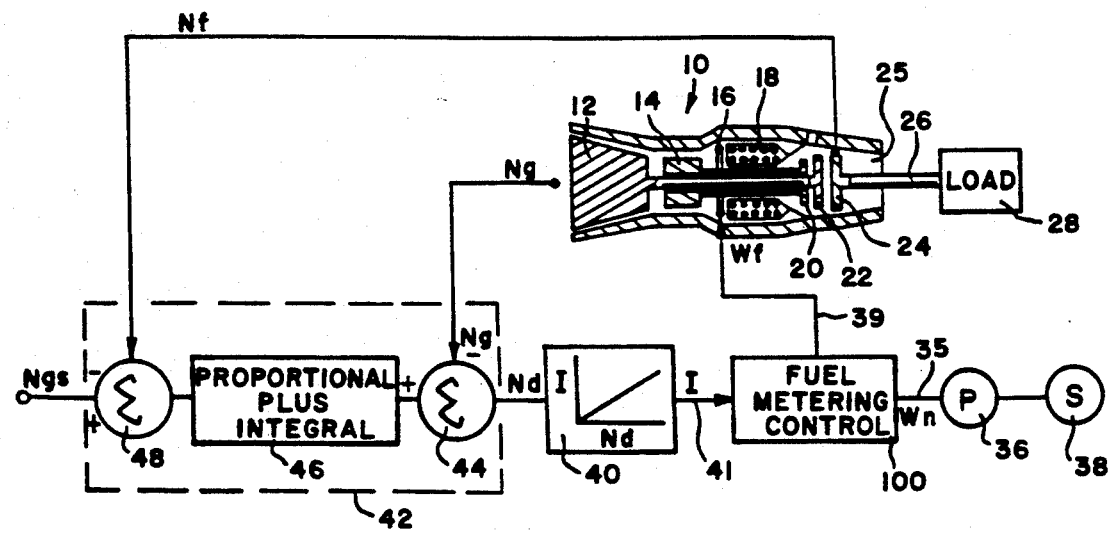
FIG. 1 is a schematic illustration of a fuel system for a turbine having a fuel metering apparatus made according to the principals of the invention disclosed herein.

The turbine engine 10 for use in providing power to drive a load 28 as shown in FIG. 1 has a housing with an inlet through which air is supplied to a first stage compressor 12, a second stage compressor 14, a first turbine 20 connected by a shaft to the second stage compressor 14, a second turbine 22 connected by a shaft to the first stage compressor 12 and a drive turbine 24 located in the exhaust nozzle 25. A plurality of fuel nozzles 16 which are located in a combustion chamber 18 receive metered fuel from a fuel metering control mechanism 100 in response to an operator input and a fuel schedule circuit 40. The fuel in chamber 18 and the air supplied thereto by the first and second stage air compressors 12 and 14 are combined as an fuel-air mixture and burned to generate a thrust as the products of combustion pass through exhaust nozzle 25. The thrust applied to drive turbine 24 is communicated to load 28 through shaft 26.

The fuel flow Wf supplied to nozzles 16 is metered fuel that is supplied from source 38 and delivered to fuel metering control 100 by pump 36.

Figure 4:
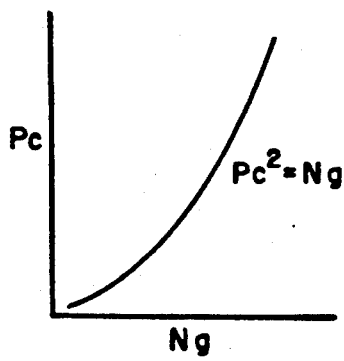
FIG. 4 is a graph illustrating compressor speed to fuel flow for the turbine of FIG. 1.

The electronic sensing and computing member 42 receives a first input signal Ngs from an input member controlled by an operator which is evaluated by a first comparator 48 with a signal Nf corresponding to actual speed of drive turbine 24. The output of comparator 48 is integrated in a proportional plus integral circuit 46 and the output is transmitted to a second comparator 44. The second comparator 44 evaluates the output from circuit 46 with a signal Ng representing the speed of the first compressor 12 to produce an operational signal Nd which is transmitted to an operational schedule circuit 40. From experience, it has been observed that operational speed Ng of compressor 12 varies with Pc in accordance with a curve as illustrated in FIG. 4. The operational signal Nd and schedule circuit 40 are evaluated and a signal I is communicated to the fuel metering control 100 for controlling the fuel supplied to turbine 10.

Figure 5:
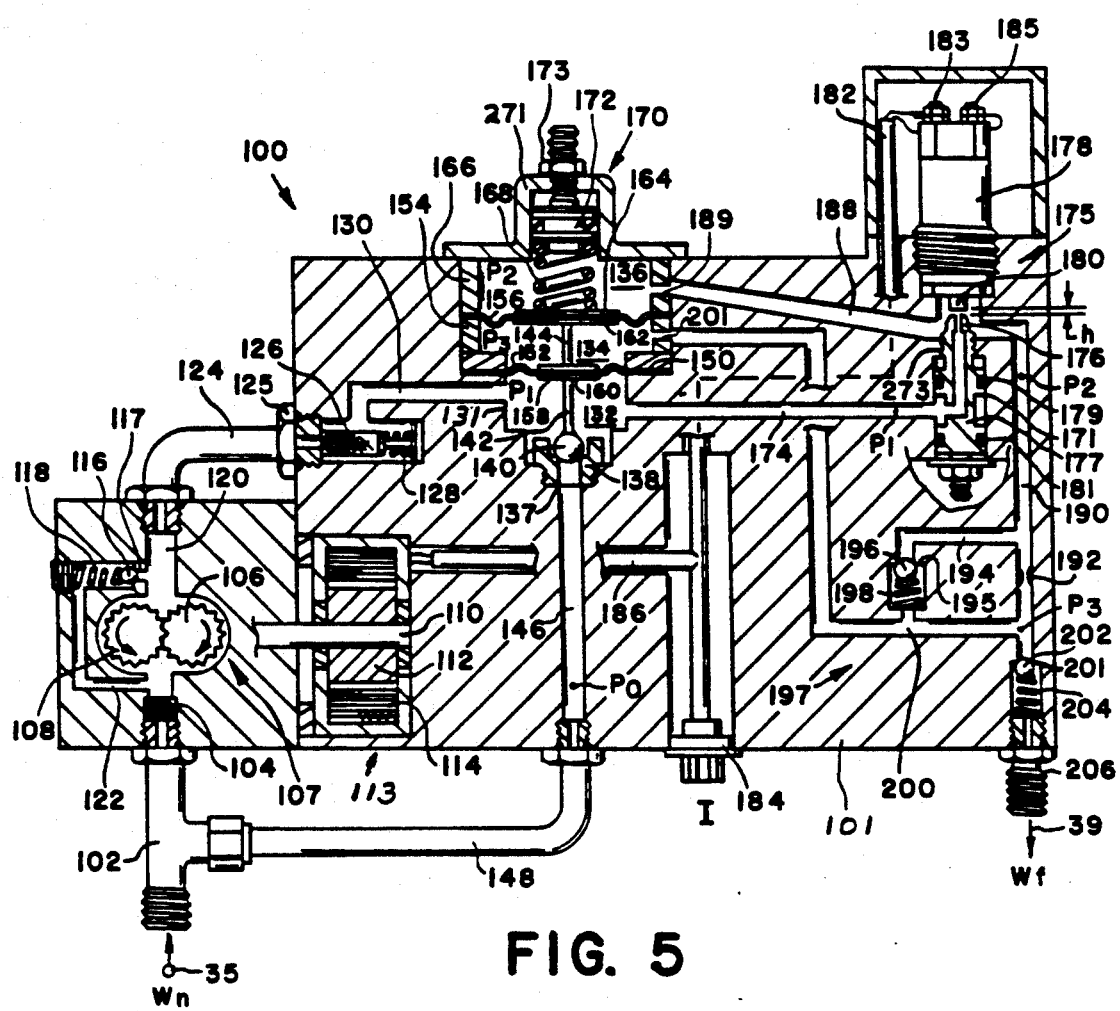
FIG. 5 is a sectional view of the fuel metering apparatus of FIG. 1.

The fuel metering control apparatus 100 of the present invention as illustrated in FIG. 5 has a housing or body 101 has an inlet conduit 102 connected to fuel supply conduit 35 coming from pump 36 for the fuel supply 38. The input fluid Wn is subsequently metered by apparatus fuel metering control 100 and communicated by conduit 39 to the engine or turbine 10. The fuel metering control apparatus 100 controls the fuel supply Wf to the turbine 10 by pressurizing the fuel from supply 38 and then providing a metered flow to the turbine 10 as a square function of an electrical signal I received from operational schedule circuit 40.

Fuel from the inlet conduit 102, after passing through an inlet filter 104, is pressurized in conduit 120 by a pair of gears 106 and 108 in pump 107. The gears 106, 108 are rotated by a driveshaft 110 which is powered by a motor 113 comprising an armature 112 and a stator coil 114. Generally, the armature 112 and stator 114 form a DC motor whose speed and thus flow rate for the pump 107 is controlled by the voltage applied to the stator coil 114. It is generally desired that the pump 107 supply adequate fuel flow somewhat in excess of the rated maximum flow of the fuel metering control or apparatus 100.

Overpressure from the pump 107 in conduit 120 may be relieved by an overpressure check valve ball 116 in a return conduit 122. Check valve ball 116 is urged against seat of opening 117 in conduit 120 by spring 118. When the pressure in conduit 120 exceeds the designed maximum pressure, spring 118 is overcome and check valve ball 116 moves away from seat of opening 117 to allow fluid communication between the upstream and downstream flow paths of the pump 107 to prevent an overpressure in conduit 120.

The pressurized fuel in conduit 120 is communicated through a conduit or pipe 124 to a filter 126 in housing 101. Filter 126 is urged against a fitting 125 for conduit 124 by a spring 128. Subsequently to being filtered, the pressurized fuel enters a supply pressure chamber 132 in bore 131 of housing 101 via conduit 130. The fuel or fluid in supply pressure chamber 132 has pressure P1 which is regulated by a regulator assembly 170 located in a bore 131.

The regulator 170 includes a valve seat 138 which is substantially cylindrical in shape with a central opening 137. Valve seat 138 is threaded into a step in bore 131 to permit communication from chamber 132 through the central opening 137 to a return bore 146 connected by conduit 148 to the inlet conduit 102.

The position of a ball valve 140 with respect to valve seat 138 regulates communication of fuel or fluid from chamber 132 to return bore 146 through opening 137 of the valve seat 138 to produce a pressure drop of the fluid or fuel of P1−P0 from supply pressure chamber 132 to a return bore 146. The fuel or fluid communicated to the return bore 146 is circulated to pump 107 with the incoming fuel in supply conduit 102 by way of conduit 148.

The regulator assembly 170 has a first diaphragm assembly 152 sealed between a step in bore 131 of the body or housing 101 of the fuel apparatus 100 and a disc-shaped spacer 150. The first diaphragm assembly 152 has a flexible disc which is sandwiched between a first backing plate 158 and second backing plate 160. The second backing plate 160 is connected to the ball valve 140 by means of a stem 142. Movements of the diaphragm assembly 152 cause positioning of the ball valve 140 and regulation of the pressure P1 in supply pressure chamber 132.

The regulator assembly 170 has a second diaphragm assembly 156 located in bore 131. The second diaphragm assembly 156 is mounted between two annular body spacer elements 154 and 166. The second diaphragm assembly 156 has a flexible disc which is sandwiched between a first backing plate 162 and second backing plate 164. The second backing plate 162 is connected by link 144 to the backing plate 158 of the first diaphragm assembly 152. Connecting link 144 is rigidly attached to the upper plate 158 of the first diaphragm assembly 152. The second diaphragm assembly 156, first diaphragm assembly 152 and body of spacer 154 form a second or control pressure chamber 134 within bore 131. Control pressure chamber 134 has a fluidic pressure P3 which acts on the lower face associated with backing plate 162 of the second diaphragm assembly 156 and the upper face associated with backing plate 158 of the first diaphragm assembly 152. The pressure P3 is supplied to the chamber 134 via a feedback conduit 200 and an aperture 201 in the body spacer 154.

A third or metered pressure chamber 136 is formed in bore 131 by the upper face associated with backing plate 164 of the second diaphragm assembly 156, the body spacer 166, and a end cap 271 of regulator 170. The fluid pressure P2 of metered fuel is communicated to chamber 136 through an aperture 189 in spacer 166 and conduit 188 connected to a metering bore 190 downstream from metering valve 175. The pressure P2 acts upon the upper face associated with backing plate 164 of the second diaphragm assembly 156 in combination with a force delivered from spring 168 mounted in a recess of the end cap 171. A movable retainer 172 can be adjusted by nut 173 to vary the spring force acting on backing plate 164 of the second diaphragm assembly 156.

After being regulated in chamber 132, the fluid pressure P1 of the supply fuel or fluid is communicated via supply conduit 174 to bore 171 of metering valve 175. Metering valve 175 has a nozzle 177 which is located or retained in bore 171 of the housing 101 by threaded connection 273. Nozzle 177 has an orifice 176 for communicating the supply fluid into metering bore 190.

Opposing the orifice 176 is a linear solenoid 178 having a substantially cylindrical armature valve 180. Fuel is metered through the orifice 176 by positioning the armature valve 180 with respect to the orifice 176 as a function of the current delivered to the solenoid 178. Current is supplied to solenoid 178 in response to an electrical signal I from computer 42 via a cable 182 which is electrically connected to a connector plug 184. The cable 182 contains electrical leads connected to terminals 183 and 185 for delivering current to the solenoid 178. The fluid pressure directly downstream of the metering orifice 176 is the metered fluid pressure P2 which as previously described is communicated to the chamber 136 of regulator assembly 170. The metered fluid pressure P2 is further communicated through a metering bore 190 and after passing through a bleed restriction 192 exits the fitting 206 as the metered fuel flow Wf for communication to injectors 16 in turbine 10 by way of conduit 39. The bleed restriction 192 is selectively sized and causes a drop in the fluid pressure from P2 to P3 of the fuel supplied to injectors 16. The control fluid pressure P3 is communicated by the conduit 200 to the control pressure chamber 134 of the regulator assembly 170.

A check valve 197 located in passage 194 fluidically parallel with the bleed restriction 192 in bore 190, limits the pressure drop of the fluid or fuel supplied to conduit 39. Check valve 197 has a ball 196 which is urged by a conical spring 198 against as seat 195 in passage to close passage 194. The check valve 196 closes communication from passage 190 through passage 194 to passage 200 unless a predetermined pressure is exceeded. Once this predetermined pressure limit has been reached spring 198 is overcome and check valve 197 opens to allow direct fluid communication between bore 190 and conduit 200 to permit a quantity of fluid or fuel to bypass bleed restriction 192. Since the pressure drop P2−P3 across the bleed restriction 192 increases with flow, the check valve 197 acts to limit this pressure differential to a maximum limit regardless of fuel flow.

A ball valve 202 located in metering bore 190 controls a minimum fluid pressure of the fuel supplied to conduit 200. Ball valve 202 is urged against a seat 201 in metering bore 190 by spring 204 to allow the system to come to a minimum pressure before fuel is communicated to the output fitting 206. Once the fluid pressure has exceeded the rate of the spring 204, the ball 202 moves away from seat 201 and fluid communication at output pressure P3 and fuel flow Wf commences to injectors 16 of engine or turbine 10.

Figure 2:
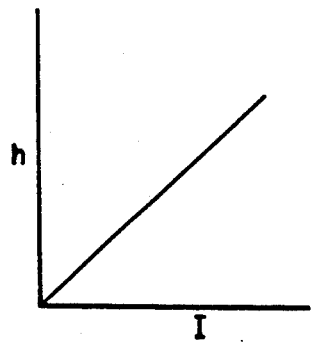
FIG. 2 is a graph illustrating I to h for the turbine of FIG. 1.
Figure 3:
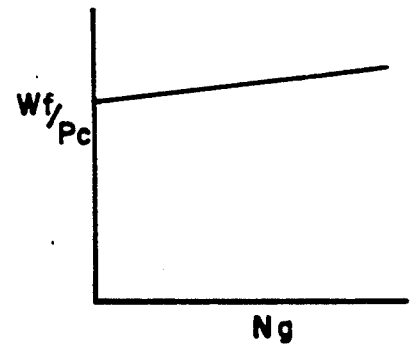
FIG. 3 is a graph illustrating compressor speed to fuel flow/engine pressure ratio for the turbine of FIG. 1.
Figure 6:
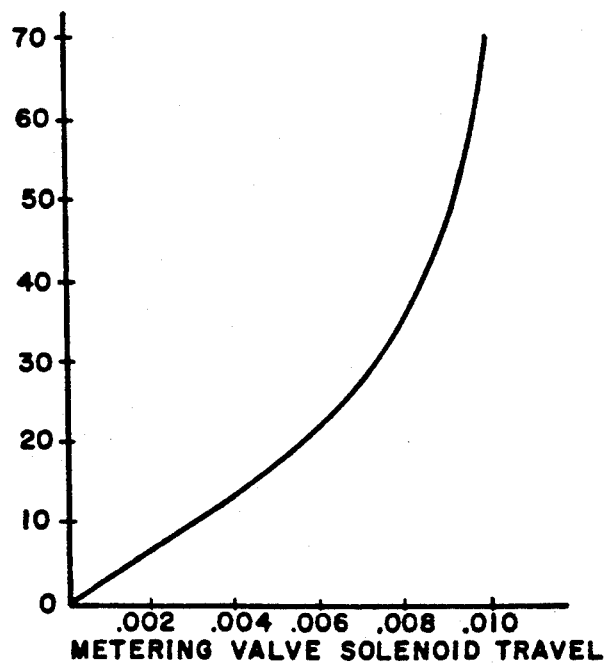
FIG. 6 is a graph illustrating fuel flow to valve travel for the fuel metering apparatus of FIG. 5.

In operation the fuel metering apparatus 100 regulates fuel flow Wf as a function of the armature valve position h in accordance with the schedule illustrated in FIG. 6. The armature valve position h being a function of the current I supplied to solenoid 178 from operational schedule circuit 40 and illustrated in FIG. 2. As can be seen in FIG. 2, the position of the armature valve 180 is substantially a linear function of the gas generator speed Ng and as a result the metered fuel flow schedule varies similarly with Ng as shown in FIG. 3. The schedule shown in FIG. 6 illustrates a nonlinear function where fuel flow is substantially the square of metering valve position or speed in accordance with one of the objects of the invention.

Basically, the fuel metering apparatus 100 provides a substantially square function flow rate by increasing the metering head pressure (P1−P3) with respect to flow rate as measured by the bleed restriction 192.

To more fully understand the method by which the metering apparatus 100 operates, consider an idling or minimum flow rate as set by a minimum pressure drop (P1−P0) across the regulator valve 170 and the check valve 202. At this time the pressure difference P2−P3 across the bleed restriction 192 is essentially zero because of the low flow rate. However, as fuel flow is increased by opening the metering valve 175 and increasing h the pressure differential P2−P3 also increases. This increasing pressure differential acting across the area of the second diaphragm assembly 156 aids the regulator spring 168 in closing the regulator valve 170 and thereafter proportionally increases the head pressure (P1−P3).

The actual function of fuel flow Wf with respect to h will now be developed for comparison. Initially, when one writes the force balance equation for the regulator valve 170 in equilibrium there is obtained the equation:

$$(P1-P3)A3 = (P2-P3)A2 + (F+Kx) + (P1-P0)A4 \quad (1)$$

where (P1−P3)A3 is the force on the first diaphragm assembly 152 acting to move the regulator ball valve 140 upward away from seat 138, (P2−P3)A2 is the force on second diaphragm assembly 156 acting to move the regulator ball valve 140 downward toward seat 138, (F+Kx) is the spring constant K acting over distance x in addition to the initial tensioning of the spring 168 acting to move the regulator ball valve 140 downward toward seat 138, and (P1−P0)A4 is the force acting to move ball valve 140 downward toward seat 138.

Now by identity:

$$(P1-P2) + (P2-P3) = (P1-P3) \quad (2)$$

Additionally note by the equation for the pressure drop across the fixed orifice 192.

$$P2-P3 = (Wf/K1)^2 \quad (3)$$

where Wf is the fuel flow and K1 is the effective area and flow constant of the bleed restriction 192.

Further, the pressure drop across the variable metering orifice 176 must be taken into consideration and can be accounted for by the following equation:

$$P1-P2 = (Wf/K_2 h)^2 \quad (4)$$

where h is the opening distance of the armature valve 180, and $K_2$ the effective area/unit distance of armature valve 180 for movement of the solenoid 178.

Substituting equations 3, 4 in equation 2 and the result in equation 1, the following result is obtained.

$$[(Wf/K_2 h)^2 + (Wf/K1)^2]A3 = (Wf/K1)^2 A2 + (F+Kz) + (P1-P0)A4 \quad (5)$$

By algebra equation 5 is rearranged as follows to become equation 6:

$$(Wf/K_2 h)^2 = \left(\frac{A2-1}{A3}\right)\left(\frac{Wf}{K1}\right)^2 + \frac{F+Kx}{A3} + (P1-P0)\frac{A4}{A3} \quad (6)$$

$$Wf = K_2 h \left(\frac{\frac{F+Kx}{A3} + (P1-P0)\frac{A4}{A3}}{1 - \left(\frac{A2-1}{A3}\right)\frac{(K_2 h)^2}{(K1)^2}}\right)^{\frac{1}{2}}$$

From the information above that when $P_2-P_3=0$ or Wf=0 are substituted in equation 6 for an initial setting, the following equation 7 is produced.

$$\frac{F+Kx}{A3} + (P1-P0)\frac{A4}{A3} = P1-P3 = K_{1-3} \quad (7)$$

Thus the initial regulator valve 170 setting can be expressed as a constant. However, from above we can show that:

$$\left(\frac{A2-1}{A3}\right)\left(\frac{K_2}{K1}\right)^2 = K_A$$

can also be expressed as a constant KA. From the above substitutions the Wf can now be expressed in the following equation:

$$Wf = K_2 h \left[ \frac{K_{-1-3}}{1 - K_A h^2} \right]^{\frac{1}{2}} \quad (8)$$

While a detailed description of the preferred embodiment and implementation has been disclosed it will be obvious to those skilled in the art that various modifications and changes may be made thereto without departing from the spirit and scope of the invention as hereinafter defined in the appended claims.

What is claimed is:

1. A fluid metering apparatus comprising:
   means for supplying fluid at a variable supply fluid pressure ($P_s$);
   means for metering said fluid to an outlet of the apparatus having a metering fluid pressure ($P_2$) in response to an electrical signal, said metering means having a controlled orifice area for controlling the flow rate of the supply fluid communicated to said outlet;
   means for modifying said supply fluid pressure $P_s$ to develop an operational supply fluid pressure $P_1$ and regulating a first pressure differential between said operational fluid pressure and said metering fluid pressure ($P_1 - P_2$) that developed across said controlled orifice as a function of said flow rate; and
   means for establishing a control fluid pressure ($P_3$) between said controlled orifice and said outlet, said control fluid pressure $P_3$ being communicated to said means for modifying said supply fluid pressure $P_s$ to develop a second pressure differential ($P_2 - P_3$) to control the development of said first pressure differential ($P_1 - P_2$) resulting in a non-linearly flow rate of fuel supplied to said outlet as a function of the flow rate through the orifice area and the size of the orifice area.

2. A fluid metering apparatus as defined in claim 1, wherein the metering means includes:
   a solenoid having an armature valve which is positionable in response to said electrical signal; and
   nozzle means having an orifice with a predetermined area which communicates with said variable supply pressure and located such that said orifice is disposed opposing said armature valve;
   wherein said controlled orifice area is changed by positioning said armature valve.

3. A fluid metering apparatus as defined in claim 2 wherein:
   said solenoid moves the armature valve linearly with respect to the current supplied by said electrical signal.

4. A fluid metering apparatus as defined in claim 3 wherein means for regulating said first pressure differential includes:
   diaphragm means for separating first, second and third chambers from each other, said first chamber receiving said operational pressure $P_1$, said first chamber receiving said operational pressure $P_1$, said second chamber receiving said metering fluid pressure $P_2$, and said third chamber receiving said control fluid pressure $P_3$, said diaphragm means responding to said operational pressure $P_1$, metering fluid pressure $P_2$ and control fluid pressure $P_3$ for varying said supply pressure $P_o$.

5. A fluid metering apparatus as defined in claim 4, wherein:
   said operational fluid pressure $P_1$ is the pressure of said supply fluid upstream of said control orifice.

6. A fluid metering apparatus as defined in claim 5, wherein:
   said metering fluid pressure $P_2$ is the pressure of said fluid downstream of said control orifice.

7. A fluid metering apparatus as define din claim 6, wherein:
   said control fluid pressure $P_3$ is proportional to said flow rate and is generated as a function of said metering fluid pressure $P_2$.

8. A fluid metering apparatus as defined in claim 7, wherein:
   said supply fluid pressure $P_o$ varies inversely with said operational fluid pressure $P_1$ and directly with said metering fluid pressure $P_2$ and said control fluid pressure $P_3$.

9. A fluid metering apparatus as defined in claim 1 wherein said means for modifying said supply fluid pressure $P_s$ includes:
   a regulation control valve which varies said supply fluid pressure $P_s$ by regulating the area of a regulation orifice communicating between said supply fluid pressure $P_s$ and a return fluid pressure $P_o$; and
   a regulator mechanism with first, second, and third pressure chambers separated by first and second movable diaphragms connected together by a support link for positioning said regulation control valve.

10. A fluid metering apparatus as defined in claim 9, wherein means for modifying said supply fluid pressure $P_s$ includes:
    a predetermined restriction disposed between said controlled orifice area and said outlet such that the pressure on the down stream side of the restriction varies as the square of the flow rate.

11. A fluid metering apparatus as defined in claim 10, wherein said means for establishing a control fluid pressure ($P_3$) further includes:
    means, fluidically paralleling said restriction, for inhibiting the increase in the pressure drop across the restriction when said drop exceeds a predetermined limit.

12. A fluid metering apparatus as defined in claim 11, wherein:
    said inhibiting means is a check valve which opens in response to the pressure drop across said restriction exceeding said limit.

* * * * *